US012689102B2

(12) United States Patent
Zhang et al.

(10) Patent No.: US 12,689,102 B2
(45) Date of Patent: Jul. 21, 2026

(54) ELECTROCHEMICAL DEVICE AND ELECTRONIC DEVICE

(71) Applicant: Ningde Amperex Technology Limited, Ningde City (CN)

(72) Inventors: Guowen Zhang, Ningde City (CN); Wu Ma, Ningde City (CN); Shengyu Hao, Ningde City (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 668 days.

(21) Appl. No.: 18/180,417

(22) Filed: Mar. 8, 2023

(65) Prior Publication Data

US 2023/0291081 A1 Sep. 14, 2023

(30) Foreign Application Priority Data

Mar. 8, 2022 (CN) .......................... 202210220824.4

(51) Int. Cl.
H01M 50/567 (2021.01)
H01M 50/55 (2021.01)
(52) U.S. Cl.
CPC ......... H01M 50/567 (2021.01); H01M 50/55 (2021.01)
(58) Field of Classification Search
CPC .. H01M 50/567; H01M 50/55; H01M 50/134; H01M 50/103; H01M 50/15; H01M 50/176; H01M 50/548; H01M 50/553; H01M 50/296; H01M 50/552; H01M 2220/30; Y02E 60/10; H01R 13/20; H01R 24/60
See application file for complete search history.

(56) References Cited

U.S. PATENT DOCUMENTS

2005/0287434 A1* 12/2005 Kim .................... H01M 50/184
429/161
2015/0222060 A1* 8/2015 Kim .................... H01R 13/187
439/675
(Continued)

FOREIGN PATENT DOCUMENTS

CN 110579891 A 12/2019
CN 212276142 U 1/2021
(Continued)

OTHER PUBLICATIONS

Supplementary European Search Report mailed Aug. 11, 2023, in European Application No. 23160578.3, 7 pages.

*Primary Examiner* — Adam J Francis
(74) *Attorney, Agent, or Firm* — XSENSUS LLP

(57) ABSTRACT

An electrochemical device includes a housing, an electrode assembly, and a first electrode. The electrode assembly is accommodated in an accommodation cavity of the housing. The first electrode includes a first plug-in portion. The first plug-in portion extends away from the accommodation cavity and protrudes beyond an outer surface of the housing. The first plug-in portion is configured to be snap fitted to a first jack of an external device. The first plug-in portion is provided with a groove or an elastic bulge. The groove or the elastic bulge of the first plug-in portion is configured to be snap-fitted to a first elastic bulge disposed protrusively on an outer wall of the first jack or the first groove provided on an inner wall of the jack respectively.

16 Claims, 10 Drawing Sheets

(56)  References Cited

U.S. PATENT DOCUMENTS

| | | | | |
|---|---|---|---|---|
| 2018/0163941 A1* | 6/2018 | Lee | ........................ | B60Q 1/007 |
| 2019/0245302 A1* | 8/2019 | Ozasa | .................. | H01R 13/629 |
| 2021/0351390 A1* | 11/2021 | Vernon | ............... | H01M 50/543 |
| 2022/0006240 A1 | 1/2022 | Chapel et al. | | |

FOREIGN PATENT DOCUMENTS

| | | | | |
|---|---|---|---|---|
| CN | 112415769 A | 2/2021 | | |
| CN | 212515228 U | 2/2021 | | |
| CN | 113419355 A | 9/2021 | | |
| EP | 3496179 A1 * | 6/2019 | .......... | H01M 50/209 |

* cited by examiner

Cross section A-A

Cross section C-C

Cross section BL-BL

ELECTROCHEMICAL DEVICE AND ELECTRONIC DEVICE

CROSS-REFERENCE TO RELATED APPLICATIONS

This application claims priority to Chinese Patent Application No. 202210220824.4, filed on Mar. 8, 2022, the whole disclosure of which is incorporated herein by reference.

TECHNICAL FIELD

This application relates to the technical field of batteries, and in particular, to an electrochemical device and an electronic device.

BACKGROUND

Pouch-type cells have the advantages of a high capacity, a light weight, high safety, and low vulnerability to explosion. Due to such advantages, more and more mobile devices are using pouch-type cells as power supplies. During the use of a mobile device, routine operations such as battery charging require relatively high rigidity of the battery cell. However, the shell of the pouch-type cell is relatively soft. When an electrode of the cell is connected to an external device, the electrode can hardly support the weight of the entire battery cell, thereby resulting in unstable connection between the electrode and the external device, and even causing the electrode to bend and be hardly connectible to the external device directly in a mechanical fixed manner.

SUMMARY

This application discloses an electrochemical device and electronic device to at least improve the stability of connection between an electrode and an external device.

The technical solutions of this application are implemented in the following way:

According to a first aspect, an embodiment of this application provides an electrochemical device. The electrochemical device includes a housing and an electrode assembly. The housing defines an accommodation cavity. The electrode assembly is accommodated in the accommodation cavity. The electrochemical device further includes a first electrode. The first electrode includes a first plug-in portion, the first plug-in portion extends away from the accommodation cavity and protrudes beyond an outer surface of the housing. The first plug-in portion is configured to be snap-fitted to a first jack of an external device, a first groove is made on an outer surface of the first plug-in portion, and the first groove is configured to be snap-fitted to a first elastic bulge disposed protrusively on an inner wall of the first jack; or, the first elastic bulge is disposed protrusively on the outer surface of the first plug-in portion. The first elastic bulge is configured to be snap-fitted to the first groove made on the inner wall of the first jack.

In an example in which the first groove is made on the first plug-in portion, when the first plug-in portion is snap-fitted to a first jack of an external device, a head of the first plug-in portion pushes and presses against the first elastic bulge. After the first elastic bulge is compressed, the first plug-in portion can be inserted further into the first jack. When the first plug-in portion is fully snap-fitted to the first jack, the first elastic bulge is just snap-fitted in the first groove, so that the first plug-in portion is inserted and fixed in the first jack of the external device, thereby increasing the gripping force and bonding strength between the first electrode and the external device.

According to some embodiments of this application, the electrochemical device further includes a second electrode. The second electrode is disposed apart from the first electrode. The second electrode includes a second plug-in portion. The second plug-in portion extends away from the accommodation cavity and protrudes beyond the outer surface of the housing. The first plug-in portion and the second plug-in portion are spaced apart in a second direction or in a third direction, the second plug-in portion is configured to be snap-fitted to the first jack of the external device. A second groove is made on an outer surface of the second plug-in portion, and the second groove is configured to be snap-fitted to a second elastic bulge disposed protrusively on an inner wall of the first jack; or, the second elastic bulge is disposed protrusively on the outer surface of the second plug-in portion, and the second elastic bulge is configured to be snap-fitted to the second groove made on the inner wall of the first jack.

According to some embodiments of this application, the electrochemical device further includes a second electrode. The second electrode is disposed apart from the first electrode. The second electrode includes a second plug-in portion. The second plug-in portion extends away from the accommodation cavity and protrudes beyond the outer surface of the housing. The first plug-in portion and the second plug-in portion are staggered in the second direction, the second plug-in portion is configured to be inserted into snap fitted to a second jack of the external device, the second plug-in portion is configured to be snap fitted to the second jack of the external device, a second groove is made on an outer surface of the second plug-in portion, and the second groove is configured to be snap-fitted to a second elastic bulge disposed protrusively on an inner wall of the second jack; or, the second elastic bulge is disposed protrusively on the outer surface of the second plug-in portion, and the second elastic bulge is configured to be snap-fitted to the second groove made on the inner wall of the second jack.

The first direction is an insertion direction of the first plug-in portion, and the first direction, the second direction, and the third direction are perpendicular to each other.

In an example in which the second groove is made on the second plug-in portion, when the second plug-in portion is fully snap-fitted to the first or the second jack, the second elastic bulge is just snap-fitted in the second groove, so that the second plug-in portion is inserted and fixed in the first or the second jack of the external device, thereby increasing the gripping force and bonding strength between the second electrode and the external device.

According to some embodiments of this application, an outline of the first plug-in portion is in a shape of a cuboid, cylinder, or polygonal prism, and the first groove is made on the outer surface of the first plug-in portion; and/or an outline of the second plug-in portion is in a shape of a cuboid, cylinder, or polygonal prism, and the second groove is made on the outer surface of the second plug-in portion.

To facilitate insertion of the first plug-in portion, the overall shape of the first plug-in portion may be configured as an elongated shape, such as the cuboid, cylinder, or polygonal prism shape in this embodiment. It is easier and more convenient to make the first groove in the plug-in portion than in the jack, thereby facilitating mass production. The same is true for the second plug-in portion.

According to some embodiments of this application, the outline of the first plug-in portion is in the shape of a cuboid, and the first groove is arc-shaped. Along a first direction, a chord length of the first groove is less than a length of the first plug-in portion. On the outer surface of the first plug-in portion, a length of the first groove is equal to the chord length of the first groove. Along a second direction, a chord height of the first groove is less than a width of the first plug-in portion, and a ratio of the chord length to the chord height of the first groove is 1 to 20. Along a third direction, a height of the first groove is less than a height of the first plug-in portion.

According to some embodiments of this application, the first groove satisfies at least one of the group consisting of: a. along the first direction, the chord length of the first groove is 1 to 15 mm; b. along the second direction, the chord height of the first groove is 0.1 to 10 mm; and c. along the third direction, the height of the first groove is less than the height of the first plug-in portion by at least 0.1 mm.

According to some embodiments of this application, the outline of the second plug-in portion is in the shape of a cuboid, and the second groove is arc-shaped. Along the first direction, a chord length of the second groove is less than a length of the second plug-in portion, the chord length of the second groove is 1 to 15 mm, and, on the outer surface of the second plug-in portion, a length of the second groove is equal to the chord length of the second groove. Along the second direction, a chord height of the second groove is less than a width of the second plug-in portion, the chord height of the second groove is 0.1 to 10 mm, and a ratio of the chord length to the chord height of the second groove is 1 to 20. Along the third direction, a height of the second groove is less than a height of the second plug-in portion by at least 0.1 mm.

By configuring the first groove as an arc shape, the arc-shaped first groove can conveniently guide the first elastic bulge to slide gradually along an arc face to compress the first elastic bulge. When the first plug-in portion needs to be unplugged during attachment and detachment, the arc-shaped first groove can also guide the first elastic bulge to slide gradually along the arc face, so that the first elastic bulge is gradually detached from the first groove, thereby ensuring smooth attachment and detachment between the electrochemical device and the external device. The same is true for the second groove that is arc-shaped.

According to some embodiments of this application, the first electrode includes a first flange portion and a first plug-in portion that are connected to each other. The first flange portion is connected to the electrode assembly. The first flange portion is snap-fitted to the inner wall of the housing. Along the second direction, the width of the first flange portion is greater than the width of the first plug-in portion; and/or, along the third direction, the height of the first flange portion is greater than the height of the first plug-in portion. The second electrode further includes a second flange portion and a second plug-in portion that are connected to each other. The second flange portion is connected to the electrode assembly. The second flange portion is snap-fitted to the inner wall of the housing. Along the second direction, the width of the second flange portion is greater than the width of the second plug-in portion; and/or, along the third direction, the height of the second flange portion is greater than the height of the second plug-in portion.

The dimensions of the two flange portions in the second direction and/or the third direction are greater than the dimensions of the plug-in portion, so that both flange portions can serve a position-limiting purpose effectively, thereby increasing the contact area between each of the two electrodes and the housing, increasing the gripping force and bonding strength between the electrode and the housing, and in turn, improving stability of connection between the electrode and the housing.

The positions of the first plug-in portion and the second plug-in portion correspond to the jacks of the external device. When the first plug-in portion and the second plug-in portion are spaced apart in the second direction or the third direction, only one jack (the first jack) needs to be made on the external device, and both the first plug-in portion and the second plug-in portion are inserted in this jack. When the first plug-in portion and the second plug-in portion are staggered in the second direction, two jacks (the first jack and the second jack) need to be made on the external device for holding the first plug-in portion and the second plug-in portion respectively.

According to some embodiments of this application, the electrochemical device further includes a first insulation piece. The first insulation piece is fixed to the housing, and the first insulation piece abuts between the first plug-in portion and the second plug-in portion.

The first insulation piece is configured to support the first plug-in portion and the second plug-in portion, and can effectively improve the overall insertion stability of the two plug-in portions when the two plug-in portions are inserted in the external device.

According to some embodiments of this application, a first snap-fit slot is made on a surface that is of the first plug-in portion and that is oriented toward the first insulation piece. A first snap-fit portion is disposed protrusively on a surface that is of the first insulation piece and that is oriented toward the first plug-in portion. The first snap-fit portion is snap-fitted in the first snap-fit slot. A second snap-fit slot is made on a surface that is of the second plug-in portion and that is oriented toward the first insulation piece. A second snap-fit portion is disposed protrusively on a surface that is of the first insulation piece and that is oriented toward the second plug-in portion. The second snap-fit portion is snap-fitted in the second snap-fit slot.

This structure can fix the first plug-in portion and the second plug-in portion properly, improve the stability of the two plug-in portions, and effectively alleviate the wobble or dislocation of the two plug-in portions.

According to some embodiments of this application, a second aspect of this application further provides an electronic device. The electronic device includes the electrochemical device according to any one of the above embodiments.

The foregoing description is merely an overview of the technical solutions of this application. Some specific embodiments of this application are described below illustratively to enable a clearer understanding of the technical solutions of this application, enable implementation of the technical solutions based on the subject-matter hereof, and make the foregoing and other objectives, features, and advantages of this application more evident and comprehensible.

REFERENCE NUMERALS

Figures 1, 2:
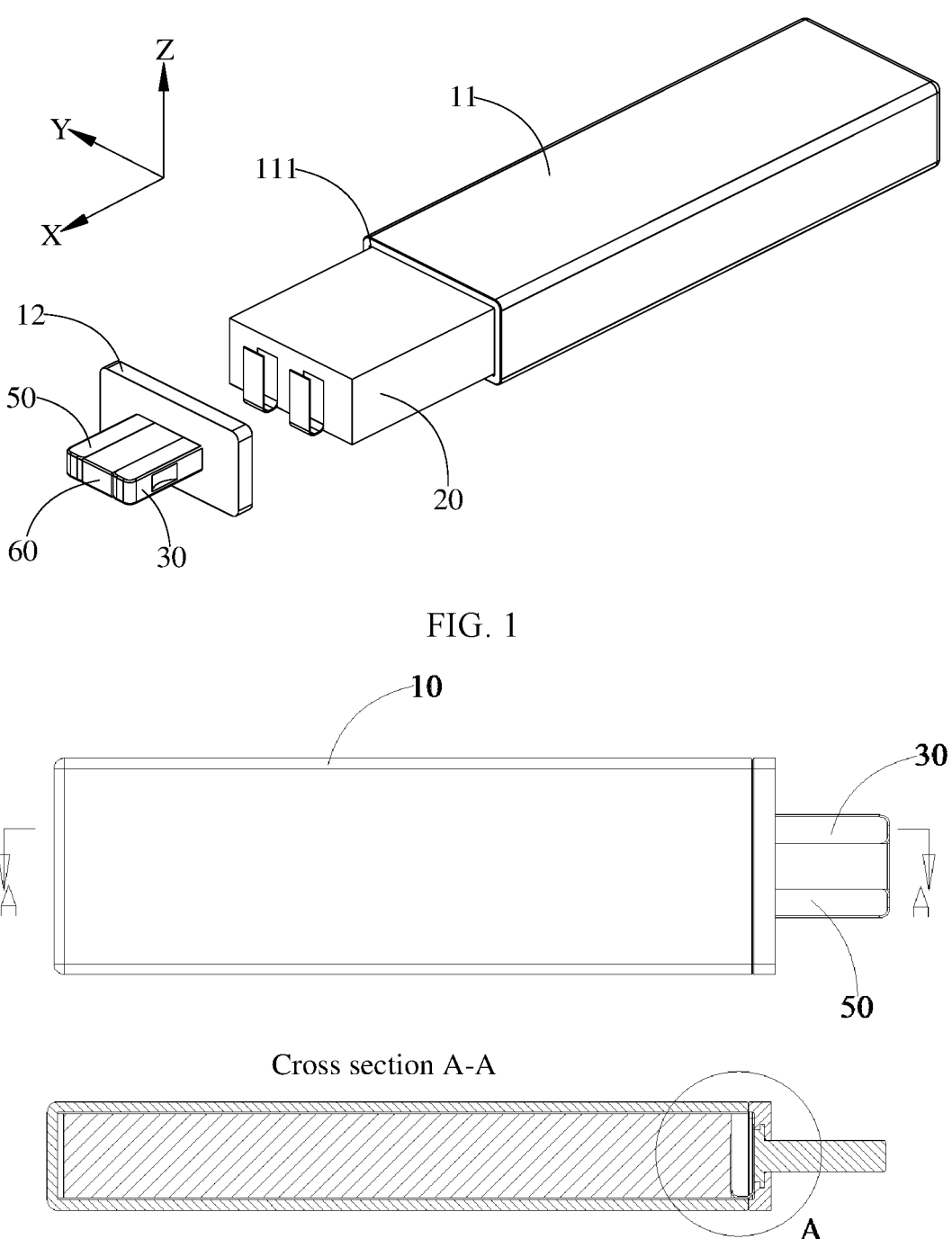
FIG. 1 is an exploded view of an electrochemical device according to some embodiments of this application.
FIG. 2 is a schematic structural diagram of an electrochemical device according to some embodiments of this application.

10. housing; 11. first part; 111. first opening; 12. second part; 121. first adhesive layer; 122. first snap-fit cavity; 123. first reach-out hole; 13. third part;
20. electrode assembly;
30. first electrode; 31. first plug-in portion; 32. first flange portion; 33. first groove; 331. head; 34. first snap-fit slot;
40. external device; 41. first jack; 42. first elastic bulge;
50. second electrode; 51. second snap-fit slot;
60. first insulation piece; 61. first snap-fit portion; 62. second snap-fit portion;
70. third electrode; 80. fourth electrode.

DETAILED DESCRIPTION

Some embodiments of the technical solutions of this application are described in detail below with reference to the drawings. The following embodiments are merely intended as examples to describe the technical solutions of this application more clearly, but not intended to limit the protection scope of this application.

Unless otherwise defined, all technical and scientific terms used herein bear the same meanings as what is normally understood by a person skilled in the technical field of this application. The terms used herein are merely intended to describe specific embodiments but not to limit this application. The terms "include" and "contain" and any variations thereof used in the specification, claims, and brief description of drawings of this application are intended as non-exclusive inclusion.

In the description of the embodiments of this application, the technical terms "first" and "second" are merely intended to distinguish between different items but not intended to indicate or imply relative importance or implicitly specify the number of the indicated technical features, specific order, or order of precedence. In the description of the embodiments of this application, unless otherwise expressly specified, "a plurality of" means two or more.

Reference to an "embodiment" herein means that a specific feature, structure or characteristic described with reference to this embodiment may be included in at least one embodiment of this application. Reference to this term in different places in the specification does not necessarily represent the same embodiment, nor does it represent an independent or alternative embodiment in a mutually exclusive relationship with other embodiments.

In the description of embodiments of this application, a directional or a positional relationship indicated by the terms such as "middle", "length", "width", and "thickness" is a directional or positional relationship based on the illustration in the drawings, and is merely intended for ease or brevity of description of embodiments of this application, but not intended to mean or imply that the indicated device or component is necessarily located in the specified direction/position or constructed or operated in the specified direction/position. Therefore, such terms are not to be understood as a limitation on embodiments of this application.

In the description of the embodiments of this application, unless otherwise expressly specified and defined, the technical terms such as "mounting", "concatenation", "connection", and "fixing" need to be understood in a broad sense, for example, understood as a fixed connection or a detachable connection or integrally formed; or understood as a mechanical connection or an electrical connection; understood as a direct connection, or an indirect connection implemented through an intermediary; or understood as internal communication between two components or interaction between two components. A person of ordinary skill in the art can understand the specific meanings of the terms in the embodiments of this application according to specific situations.

In addition, to the extent that no mutual conflict occurs, the technical features described below in different embodiments of this application may be combined with each other.

Pouch-type cells have the advantages of a high capacity, a light weight, high safety, and low vulnerability to explosion. Due to such advantages, more and more mobile devices are using pouch-type cells as power supplies. During the use of a mobile device, routine operations such as battery charging require relatively high rigidity of the battery cell. However, the shell of the pouch-type cell is relatively soft. When an electrode of the cell is connected to an external device, the electrode can hardly support the weight of the entire battery cell, thereby resulting in unstable connection between the electrode and the external device, and even causing the electrode to bend and be hardly connectible to the external device directly in a mechanical fixed manner.

To alleviate the foregoing problem, in a first aspect, an embodiment of this application discloses an electrochemical device. Referring to FIG. 1 and FIG. 2, the electrochemical device includes a housing 10, an electrode assembly 20, and a first electrode 30.

With respect to the housing 10, as shown in FIG. 1, the overall shape of the housing 10 may be configured as a flat cuboid that includes three dimensions: length, width, and height. The length direction is the X direction in FIG. 1, the width direction is the Y direction in FIG. 1, and the height direction is the Z direction in FIG. 1. For ease of description, in this application, the X direction is defined as a first direction, the Y direction is defined as a second direction, and the Z direction is defined as a third direction. The first direction, the second direction, and the third direction are perpendicular to each other. In other embodiments, the housing 10 may be in the shape of a cylinder, an arc, an ellipse, a polygonal prism, or the like.

As shown in FIG. 1, the housing 10 includes a first part 11 and a second part 12. The first part 11 and the second part 12 may be made of rigid plastic, for example, an electrolyte-resistant material such as LCP, PHBA, PET, PVC, Pi, PP, ABS, PC, or PA. The first part 11 defines an accommodation cavity (not shown in the drawing). The accommodation cavity is configured to accommodate the electrode assembly 20. A first opening 111 is made in the first part 11 of the housing 10, and the first opening 111 is in communication with the accommodation cavity. The second part 12 is connected to the first opening 111. The second part 12 and the first part 11 may be connected by welding, snap-fit connection, bonding, or the like.

With respect to the electrode assembly 20, as shown in FIG. 1, the electrode assembly 20 is accommodated in the accommodation cavity. The electrode assembly 20 generally includes a positive electrode plate, a separator, and a negative electrode plate. The separator is disposed between the positive electrode plate and the negative electrode plate to separate the positive electrode plate from the negative electrode plate. The positive electrode plate, the separator, and the negative electrode plate are sequentially stacked or wound to form the electrode assembly 20.

With respect to the first electrode 30, the first electrode 30 is an electrode lead-out piece of the electrode assembly 20, and may be configured as a positive electrode or a negative electrode. For example, when the first electrode is a positive electrode, the first electrode 30 may be made of a material selected from Al, Ni, stainless steel, a composite material, and the like. The first electrode 30 may be processed by machining, stamping, or the like.

Figure 3:
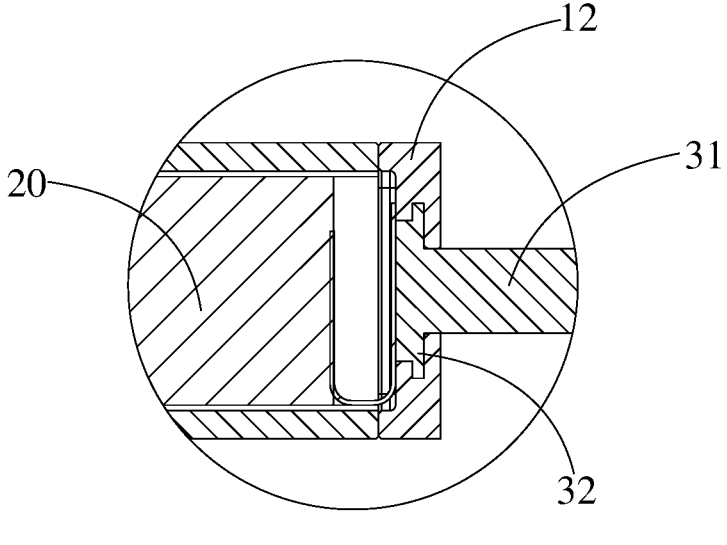
FIG. 3 is a close-up view A of FIG. 2.

Referring to FIG. 1 to FIG. 3, the first electrode 30 is disposed in the second part 12. The first electrode 30 includes a first plug-in portion 31 and a first flange portion 32. The first plug-in portion 31 is fixed onto the first flange portion 32. That is, the first plug-in portion 31 and the first flange portion 32 are formed in one piece, or the first plug-in portion 31 is fixedly connected to the first flange portion 32 by welding or other means. The first flange portion 32 is snap-fitted in the second part 12, and the first flange portion 32 is connected to the electrode assembly 20. The first plug-in portion 31 extends away from the accommodation cavity and protrudes beyond the outer surface of the second part 12.

Figure 4:
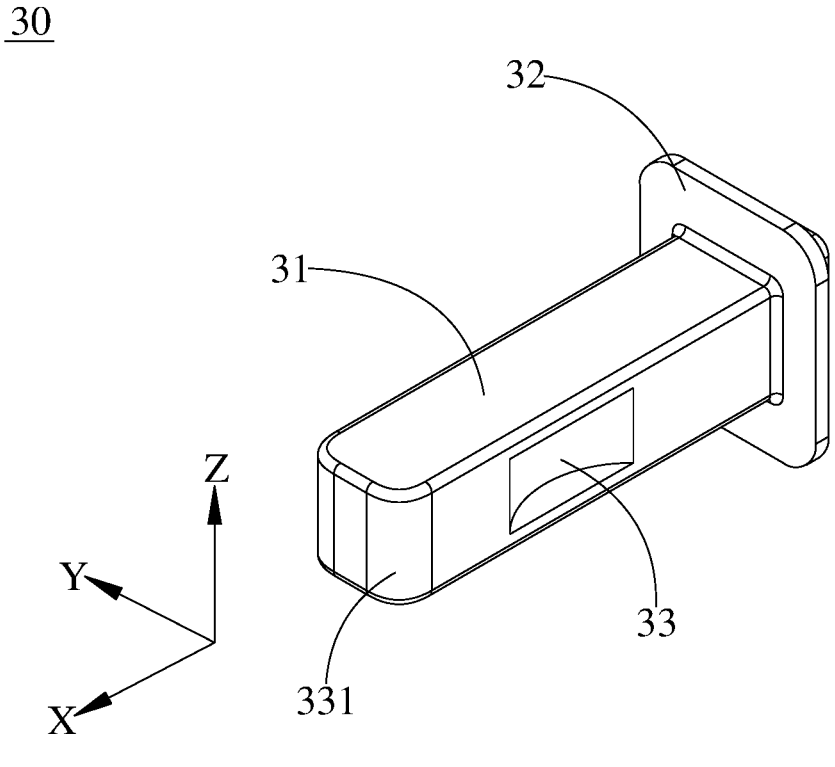
FIG. 4 is a schematic structural diagram of a first electrode according to some embodiments of this application.
Figure 5:
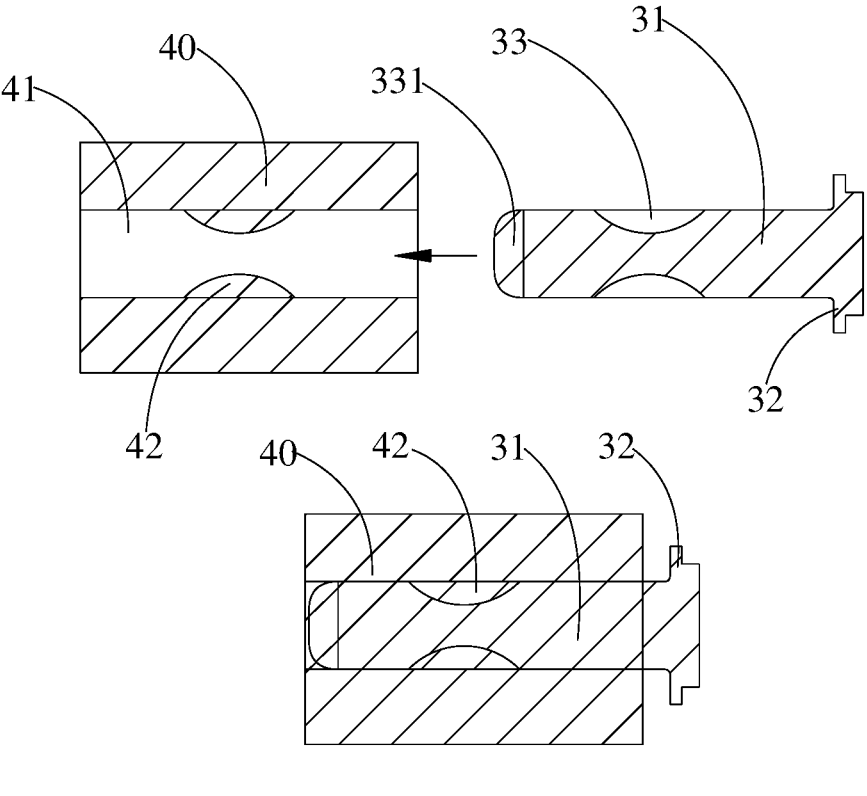
FIG. 5 is a schematic diagram of plug-in connection between a first electrode and an external device according to some embodiments of this application.

The first flange portion 32 is configured to snap-fasten the entire first electrode 30 to the second part 12, and the first plug-in portion 31 is configured to be snap-fitted to the first jack 41 of the external device 40. Referring to FIG. 4 and FIG. 5, a first groove 33 is made on the outer surface of the first plug-in portion 31. Taking a cuboidal first plug-in portion 31 as an example, the first groove 33 may be made on one sidewall of the first plug-in portion 31 or on two opposite sidewalls of the first plug-in portion 31. A first elastic bulge 42 is disposed protrusively on the inner wall of the first jack 41. The first elastic bulge 42 corresponds to the first groove 33. The outline of the first groove 33 matches the outline of the first elastic bulge 42.

As shown in FIG. 5, when the first plug-in portion 31 is snap-fitted to the first jack 41 of the external device 40, a head 331 of the first plug-in portion 31 pushes and presses against the first elastic bulge 42. After the first elastic bulge 42 is compressed, the first plug-in portion 31 can be inserted further into the first jack 41. When the first plug-in portion 31 is fully snap-fitted to the first jack 41, the first elastic bulge 42 is just snap-fitted in the first groove 33, so that the first plug-in portion 31 is inserted and fixed in the first jack 41 of the external device 40, thereby increasing the gripping force and bonding strength between the first electrode 30 and the external device 40.

In other embodiments, the first groove 33 may be made on the inner wall of the first jack 41 instead, and the first elastic bulge 42 is disposed on the first plug-in portion 31; or, the first groove 33 and the first elastic bulge 42 are disposed on the first plug-in portion 31. Correspondingly, the first elastic bulge 42 and the first groove 33 are disposed on the inner wall of the first jack 41.

In an embodiment, in order to increase the bonding strength between the first plug-in portion 31 and the first elastic bulge 42, the overall size of the first elastic bulge 42 may be set to be slightly larger than the overall size of the first groove 33, so that the first elastic bulge 42 still exerts an elastic force on the first plug-in portion 31 when the first elastic bulge 42 is snap-fitted to the first groove 33, thereby further increasing the gripping force and bonding strength between the first elastic bulge 42 and the first plug-in portion 31.

In an embodiment, referring to FIG. 4 and FIG. 5, in order to facilitate the first plug-in portion 31 in pushing against and compressing the first elastic bulge 42, the head 331 of the first plug-in portion 31 may be configured as a smooth curved face. The smooth curved face guides the first elastic bulge 42 in compressing so that the first plug-in portion 31 can be easily inserted into the first jack 41.

Referring to FIG. 3 and FIG. 4, the first flange portion 32 may be configured as a flat plate shape. The first flange portion 32 protrudes beyond a peripheral sidewall of the first plug-in portion 31 to increase the contact area between the first electrode 30 and the second part 12. In an embodiment, the first flange portion 32 is perpendicular to the first plug-in portion 31. To increase the overall strength of the first electrode 30, the first flange portion 32 and the first plug-in portion 31 may be formed in one piece. In this embodiment, the first flange portion 32 of the first electrode 30 is snap-fitted to the second part 12 of the housing 10. The first flange portion 32 serves a position-limiting purpose, and the first flange portion 32 increases the contact area between the first electrode 30 and the housing 10, so as to increase the gripping force and bonding strength between the first electrode 30 and the housing 10, improve stability of connection between the first electrode 30 and the housing 10, and make the first electrode 30 rigid enough to support the entire electrochemical device.

According to some embodiments of this application, as shown in FIG. 1, the electrochemical device further includes a second electrode 50. The second electrode 50 is also disposed in the second part 12 of the housing 10, and the second electrode 50 is disposed apart from the first electrode 30. The second electrode 50 is a negative electrode. The second electrode 50 may be made of a material selected from Cu, Ni, Li, stainless steel, and the like. The second electrode 50 may also be formed by machining, stamping, or other processing methods.

The outline of the second electrode 50 may be configured in the same way as the first electrode 30. The second electrode 50 includes a second flange portion (not shown in the drawing) and a second plug-in portion (not shown in the drawing) that are connected to each other. The second flange portion is connected to the electrode assembly 20, and the second plug-in portion extends away from the accommodation cavity and protrudes beyond the outer surface of the second part 12.

In this embodiment, a second groove (not shown in the drawing) is made on the second plug-in portion. Correspondingly, a second elastic bulge (not shown in the drawing) is disposed in the second jack of the external device 40. When the second plug-in portion is fully inserted into the second jack, the second elastic bulge is just snap-fitted in the second groove, so that the second plug-in portion is inserted and fixed in the second jack of the external device 40, thereby increasing the gripping force and bonding strength between the second electrode 50 and the external device 40.

It is hereby noted that the second groove may be made on the inner wall of the second jack instead, and the second elastic bulge is disposed on the second plug-in portion; or, both the second groove and the second elastic bulge are disposed on the plug-in portion. Correspondingly, the second elastic bulge and the second groove are disposed on the inner wall of the second jack.

The second flange portion may be disposed in the same way as the first flange portion 32. In an embodiment, the second flange portion and the first flange portion 32 are parallel and symmetrical to each other, and the second flange portion is perpendicular to the second plug-in portion.

The second flange portion of the second electrode 50 is snap-fitted to the second part 12 of the housing 10. In this way, the second flange portion serves a position-limiting purpose, and the second flange portion increases the contact area between the second electrode 50 and the housing 10, so as to increase the gripping force and bonding strength between the second electrode 50 and the housing 10, improve stability of connection between the second electrode 50 and the housing 10, and ensure the second electrode 50 to be rigid enough to support the entire electrochemical device. When the two electrodes are inserted into the external device 40, the two electrodes are parallel and symmetrical to each other, so that the two electrodes are evenly stressed, thereby further improving the stability of the two electrodes in supporting the entire electrochemical device.

According to some embodiments of this application, the outline of the first plug-in portion 31 is in the shape of a cuboid, cylinder, or polygonal prism, and the first groove 33 is made on the outer surface of the first plug-in portion 31.

For ease of inserting the first plug-in portion 31, the overall shape of the first plug-in portion 31 may be configured as an elongated shape, such as the cuboid, cylinder, or polygonal prism shape in this embodiment. With respect to the position of the first groove 33, making the first groove 33 in the first jack 41 is obviously rather troublesome while making the first groove 33 on the first plug-in portion 31 is simpler. Therefore, in a preferred embodiment, the first groove 33 is made on the outer surface of the first plug-in portion 31. Based on the same inventive concept, the outline of the second plug-in portion is in the shape of a cuboid, cylinder, or polygonal prism, and the second groove is made on the outer surface of the second plug-in portion.

According to some embodiments of this application, as shown in FIG. 4, the outline of the first plug-in portion 31 is cuboidal. Understandably, the manufacturing process of the cuboidal first plug-in portion 31 is simple. Using the cuboidal first plug-in portion 31 as an example, the shape of the first jack 41 may also be configured as a cuboidal shape that matches the first plug-in portion 31, so as to ensure that the first plug-in portion 31 rubs against the inner wall of the first jack 41 on all sides. In an embodiment, along the first direction, the length of the cuboidal first plug-in portion 31 may be set to 1 to 20 mm. Along the second direction, the width of the first plug-in portion 31 may be set to 1 to 10 mm. Generally, the length of the first plug-in portion 31 is greater than the width of the first plug-in portion 31. Along the third direction, the height of the first plug-in portion 31 may be set to 0.5 to 10 mm. In other preferred embodiments, the first plug-in portion 31 is 2 to 10 mm long, 1 to 5 mm wide, and 1 to 4 mm high.

The first groove 33 may be in the shape of an arc, a rectangle, a polygon, or the like. In this embodiment, the first groove 33 is preferably in the shape of an arc. Referring to FIG. 4 and FIG. 5, the first plug-in portion 31 and the first elastic bulge 42 are subjected to a force parallel to the first plug-in portion 31. In inserting the first plug-in portion 31 into the first jack 41, the arc-shaped first groove 33 is in smooth contact with the first elastic bulge 42. The arc-shaped first groove 33 guides the first elastic bulge 42 to slide gradually along the arc face and compress the first elastic bulge 42 at the same time. When the first plug-in portion 31 is fully inserted into the first jack 41, the first elastic bulge 42 is snap-fitted into the first groove 33. When the first plug-in portion 31 needs to be unplugged during attachment and detachment, the arc-shaped first groove 33 can also guide the first elastic bulge 42 to slide gradually along the arc face, so that the first elastic bulge 42 is gradually detached from the first groove 33, thereby ensuring smooth attachment and detachment between the electrochemical device and the external device 40.

Figure 6:
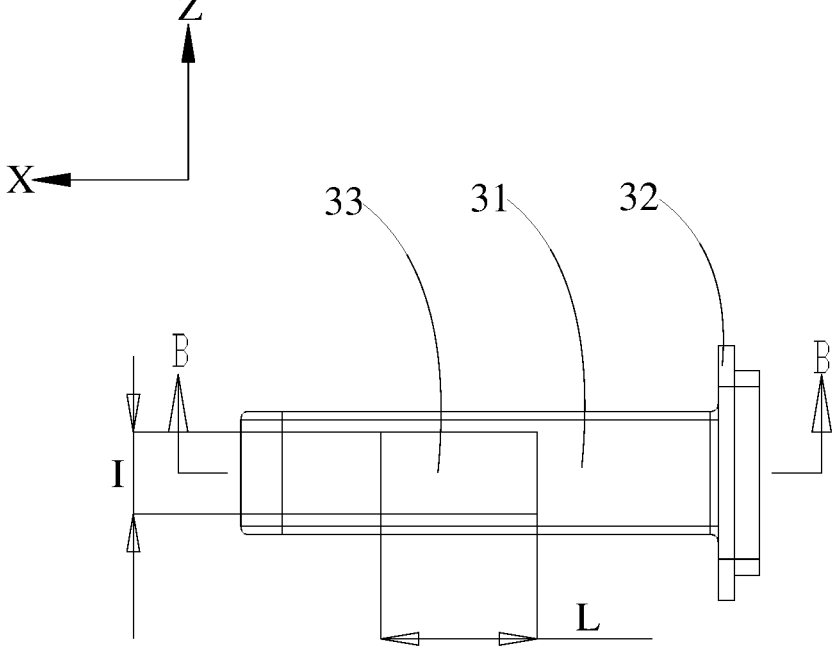
FIG. 6 is a schematic structural diagram of a first electrode according to some embodiments of this application.
Figure 7:
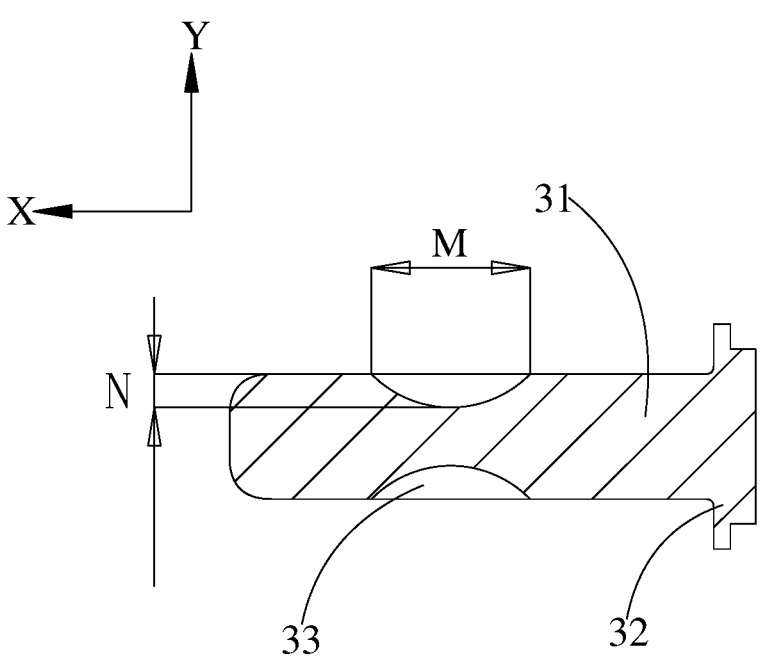
FIG. 7 is a sectional view of sectioning along a line B-B shown in FIG. 6.
Figure 8:
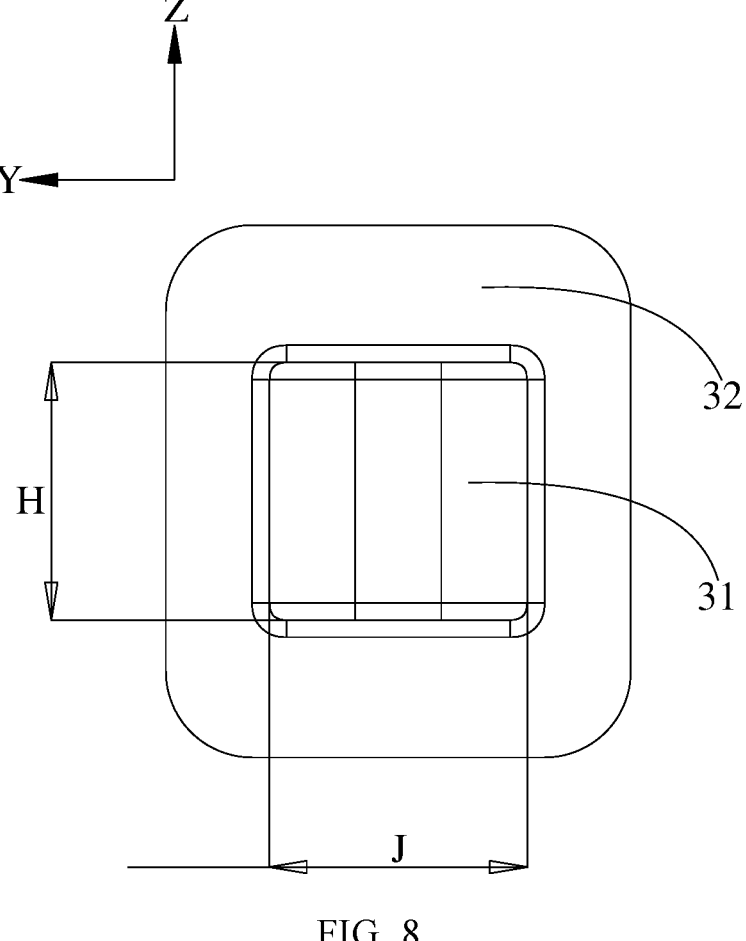
FIG. 8 is a schematic structural diagram of a first electrode according to some embodiments of this application.

Specifically, referring to FIG. 6 to FIG. 8, along the first direction, a chord length M of the first groove 33 is less than a length of the first plug-in portion 31, and the chord length M of the first groove 33 is 1 to 15 mm. On the outer surface of the first plug-in portion 31, a length L of the first groove 33 is equal to the chord length M of the first groove 33. Along the second direction, a chord height N of the first groove 33 is less than a width J of the first plug-in portion 31. The chord height of the first groove 33 is 0.1 to 10 mm. A ratio of the chord length M to the chord height N of the first groove 33 is 1 to 20. Along the third direction, the height I of the first groove 33 is less than the height H of the first plug-in portion 31 by at least 0.1 mm. Sufficient length, width, and height of the first groove 33 can increase the strength of the snap-fit between the first plug-in portion 31 and the first elastic bulge 42. It is hereby noted that in this embodiment, the first direction is the same as the insertion direction of the first plug-in portion 31.

Based on the same inventive concept, the outline of the second plug-in portion may also be configured as a cuboidal shape, and the second groove may also be configured as arc-shaped. Along the first direction, a chord length of the second groove is less than a length of the second plug-in portion. The chord length of the second groove is 1 to 15 mm. On the outer surface of the second plug-in portion, a length of the second groove is equal to the chord length of the second groove. Along the second direction, a chord height of the second groove is less than a width of the second plug-in portion. The chord height of the second groove is 0.1 to 10 mm. A ratio of the chord length to the chord height of the second groove is 1 to 20. Along the third direction, a height of the second groove is less than a height of the second plug-in portion by at least 0.1 mm.

In a preferred embodiment, the chord length of the first groove 33 and the second groove may be set to 3 to 6 mm, and the chord height of the first groove 33 and the second groove is 0.5 to 2 mm. In another preferred embodiment, the chord length of the first groove 33 and the second groove may be set to 1 to 5 mm, 8 to 12 mm, 10 to 15 mm, or the like. The chord length depends on the length of the plug-in portion, and is usually slightly less than the length of the plug-in portion. The chord height of the first groove 33 and the second groove may be set to 0.1 to 0.5 mm, 0.3 to 1 mm, 1 to 5 mm, 3 to 7 mm, or 5 to 10 mm instead.

According to some embodiments of this application, the first flange portion 32 is snap-fitted to the inner wall of the housing 10. Along the second direction, the width of the first flange portion 32 is greater than the width of the first plug-in portion 31; and/or, along the third direction, the height of the first flange portion 32 is greater than the height of the first plug-in portion 31.

Figure 9:
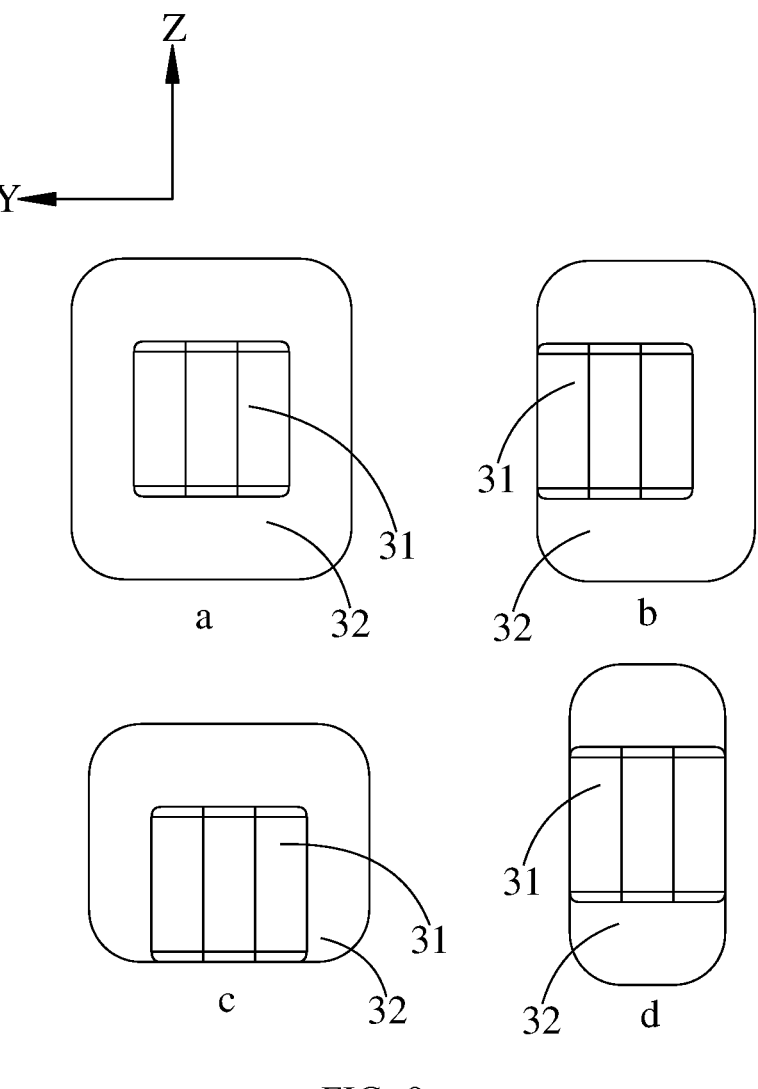
FIG. 9 is a schematic diagram of various dimensional relationships between a first flange portion and a first plug-in portion according to some embodiments of this application.

As shown in FIG. 9, the first electrode 30 may be configured as a two-sided flange structure or a multi-sided flange structure. Specifically, as shown in part a of FIG. 9, the first electrode 30 is a four-sided flange structure, the first flange portion 32 protrudes beyond both sides of the first plug-in portion 31 along the second direction, and the first flange portion 32 protrudes beyond both sides of the first plug-in portion 31 along the third direction. Alternatively, as shown in part b of FIG. 9, the first electrode 30 is a three-sided flange structure, the first flange portion 32 protrudes beyond both sides of the first plug-in portion 31 along the third direction, and protrudes beyond only one side of the first plug-in portion 31 along the second direction. Alternatively, as shown in part c of FIG. 9, the first flange portion 32 protrudes beyond both sides of the first plug-in portion 31 along the second direction, and protrudes beyond only one side of the first plug-in portion 31 along the third direction. Alternatively, the first electrode 30 is a two-sided flange structure, and, as shown in part d of FIG. 9, the first flange portion 32 protrudes beyond both sides of the first plug-in portion 31 only along the third direction, or, the first flange portion 32 protrudes beyond both sides of the first plug-in portion 31 only along the second direction.

It is hereby noted that the larger the contact area between the first flange portion 32 and the second part 12, the more stable the connection between the first electrode 30 and the second part 12. In other embodiments, the first electrode 30 may be configured as a single-sided flange structure. However, the contact area between the single-sided flange structure and the second part 12 is relatively small, and the single-sided flange can limit position in only one direction, thereby leading to insufficient stability of the snap-fit between the first electrode 30 and the second part 12. Understandably, the four-sided flange structure is optimal. The four-sided flange structure is evenly stressed and structurally stable. In addition, the four-sided flange structure increases the contact area between the first electrode 30 and the second part 12, thereby further increasing the gripping force and bonding strength between the first electrode 30 and the second part 12.

Based on the same inventive concept, the second flange portion is snap-fitted to the inner wall of the housing 10. Along the second direction, the width of the second flange portion is greater than the width of the second plug-in portion; and/or, along the third direction, the height of the second flange portion is greater than the height of the second plug-in portion.

The first flange portion 32 is snap-fitted to the second part 12, and the second flange portion is snap-fitted to the second part 12. The dimensions of the two flange portions in the second direction and/or the third direction are greater than the dimensions of the plug-in portion, so that both flange portions can serve a position-limiting purpose effectively, thereby increasing the contact area between each of the two electrodes and the housing 10, increasing the gripping force and bonding strength between the electrode and the housing 10, and in turn, improving stability of connection between the electrode and the housing 10.

Figure 10:
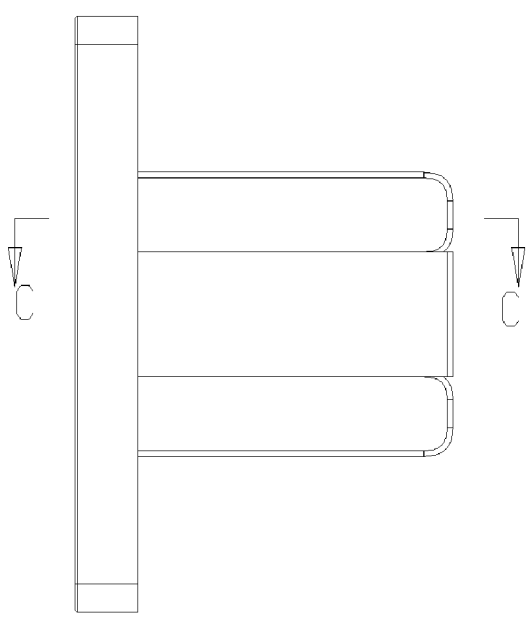
FIG. 10 is a schematic structural diagram of a first electrode according to some embodiments of this application.
Figure 10:
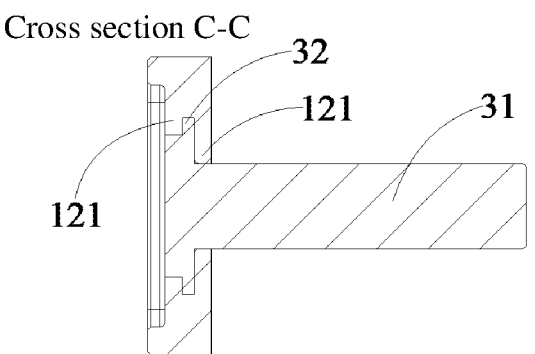

According to some embodiments of this application, as shown in FIG. 10, along the first direction, the thickness of the first flange portion 32 is 0.05 to 3 mm; and/or, along the first direction, a first adhesive layer 121 abuts against both sides of the first flange portion 32, and the thickness of the first adhesive layer 121 is 0.1 to 3 mm. The thickness of the first adhesive layer 121 may be set to be greater than the thickness of the first flange portion 32. The sufficient thickness of the first adhesive layer 121 can effectively ensure a stable bearing force of the second part 12, thereby reducing the deformation or fracture of the second part 12. It is hereby noted that the thicknesses of the first adhesive layers 121 on the two sides of the first flange portion 32 may be the same or different.

Based on the same inventive concept, along the first direction, the thickness of the second flange portion is 0.05 to 3 mm; and/or, along the first direction, a second adhesive layer (not shown in the drawing) abuts against both sides of the second flange portion, and the thickness of the second adhesive layer 121 is 0.1 to 3 mm. The sufficient thickness of the second adhesive layer can effectively ensure a stable bearing force of the second part 12, thereby reducing the deformation or fracture of the second part 12. In another preferred embodiment, the thickness of both the first flange portion 32 and the second flange portion is 0.05 to 1 mm, and the thickness of both the first adhesive layer 121 and the second adhesive layer is 0.2 to 1 mm.

Figure 11:
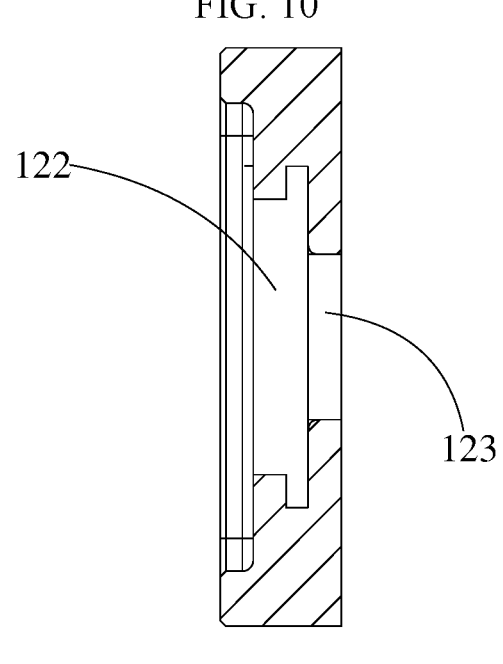
FIG. 11 is a schematic structural diagram of a second part according to some embodiments of this application.

According to some embodiments of this application, referring to FIG. 10 and FIG. 11, the second part 12 is equipped with a first snap-fit cavity 122 and a first reach-out hole 123 that communicate with each other. The first snap-fit cavity 122 matches the first flange portion 32. The first flange portion 32 is snap-fitted to the first snap-fit cavity 122. The first snap-fit cavity 122 communicates with the accommodation cavity to facilitate being connected to the electrode assembly 20. The reach-out hole 123 matches the first plug-in portion 31. The first plug-in portion 31 extends out of the first reach-out hole 123 and protrudes beyond the outer surface of the second part 12.

The first snap-fit cavity 122 matches the first flange portion 32 so that the first flange portion 32 closely fits the inner wall of the first snap-fit cavity 122, thereby further increasing the contact area between the first flange portion 32 and the second part 12 and ensuring stability of connection between the first electrode 30 and the housing 10. Similarly, the first reach-out hole 123 matches the first plug-in portion 31. The inner wall of the first reach-out hole 123 closely fits the first plug-in portion 31, thereby increasing the contact area between the first plug-in portion 31 and the second part 12. In addition, the first reach-out hole 123 can limit the position of the first plug-in portion 31 to ensure that the first plug-in portion 31 fully extends out along the first reach-out hole 123.

Based on the same inventive concept, the second part 12 is further equipped with a second snap-fit cavity (not shown in the drawing) and a second reach-out hole (not shown in the drawing) that communicate with each other. The second snap-fit cavity matches the second flange portion. The second flange portion is snap-fitted in the second snap-fit cavity, and the second snap-fit cavity communicates with the accommodation cavity. The second reach-out hole matches the second plug-in portion. The second plug-in portion extends out of the second reach-out hole and protrudes beyond the outer surface of the second part 12.

Figure 12:
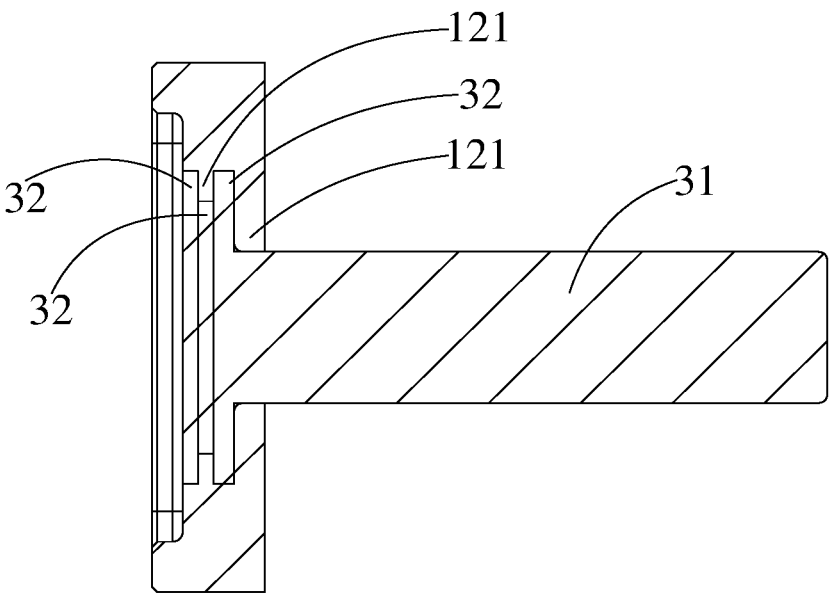
FIG. 12 is a schematic diagram of a plurality of first flange portions stacked together.

According to some embodiments of this application, as shown in FIG. 12, both the first flange portion 32 and the first snap-fit cavity 122 are plural. Along a direction from the first snap-fit cavity 122 to the first reach-out hole 123, a plurality of first flange portions 32 are stacked in sequence. Along a stacking direction perpendicular to the plurality of first flange portions 32, two adjacent first flange portions 32 differ in length. Each first flange portion 32 is snap-fitted in a matching first snap-fit cavity 122. It is hereby noted that, in this embodiment, a direction from the first snap-fit cavity 122 to the first reach-out hole 123 is the first direction.

The plurality of first flange portions 32 are stacked in layers to increase the aggregate dimension of the first flange portions 32 in the first direction and alleviate the deformation of the first flange portions 32. Moreover, two adjacent first flange portions 32 differ in length. Therefore, a first adhesive layer 121 exists on both sides of each relatively long first flange portion 32, so as to abut and support the relatively long first flange portion 32. The sufficient first adhesive layers 121 can effectively ensure a stable bearing force of the second part 12, thereby reducing the deformation or fracture of the second part 12.

Based on the same inventive concept, both the second flange portion and the second snap-fit cavity are plural. Along a direction from the second snap-fit cavity to the second reach-out hole, a plurality of second flange portions are stacked in sequence. Along a stacking direction perpendicular to the plurality of second flange portions, two adjacent second flange portions differ in length. Each second flange portion is snap-fitted in a matching second snap-fit cavity.

Figure 13:
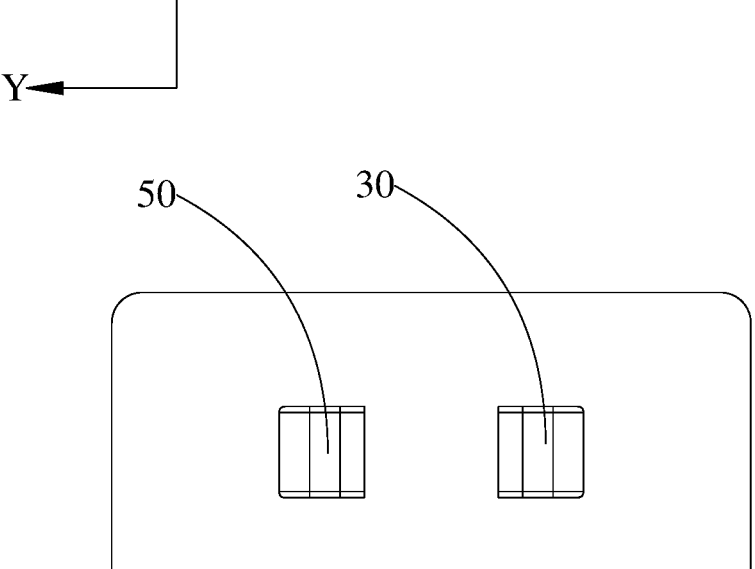
FIG. 13 is a schematic diagram of a positional relationship between a first electrode and a second electrode according to some embodiments of this application.
Figure 14:
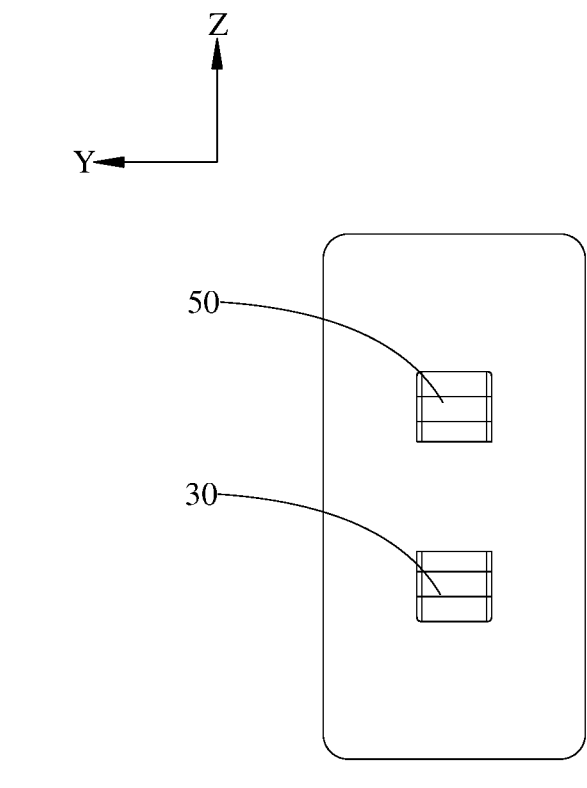
FIG. 14 is a schematic diagram of a positional relationship between a first electrode and a second electrode according to some embodiments of this application.
Figure 15:
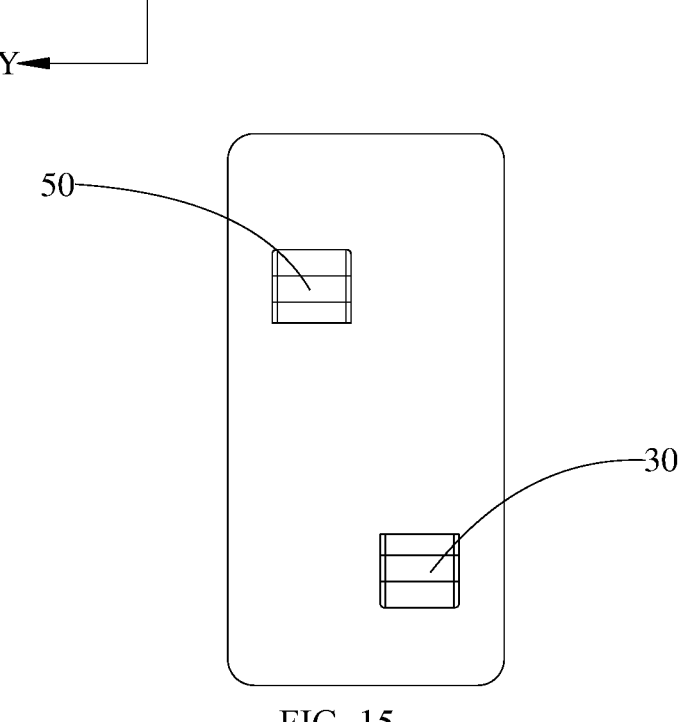
FIG. 15 is a schematic diagram of a positional relationship between a first electrode and a second electrode according to some embodiments of this application.

With respect to the positions of the first plug-in portion 31 and the second plug-in portion, as shown in FIG. 13, the first plug-in portion 31 and the second plug-in portion are spaced apart in the second direction; or, as shown in FIG. 14, the first plug-in portion 31 and the second plug-in portion are spaced apart in the third direction; or, as shown in FIG. 15, the first plug-in portion 31 and the second plug-in portion are staggered in the second direction. It is hereby noted that the staggered arrangement of the first plug-in portion 31 and the second plug-in portion in the second direction also means staggered arrangement of the first plug-in portion 31 and the second plug-in portion in the third direction.

The positions of the first plug-in portion 31 and the second plug-in portion correspond to the jacks 41 of the external device 40. When the first plug-in portion 31 and the second plug-in portion are spaced apart in the second direction or the third direction, only the first jack 41 needs to be made on the external device 40, and both the first plug-in portion 31 and the second plug-in portion are inserted in this first jack 41. When the first plug-in portion 31 and the second plug-in portion are staggered in the second direction, two jacks (the first jack 41 and the second jack) need to be made on the external device 40 for holding the first plug-in portion 31 and the second plug-in portion respectively.

According to some embodiments of this application, as shown in FIG. 1, the electrochemical device further includes a first insulation piece 60. The first insulation piece 60 is fixed to the housing 10, and the first insulation piece 60 abuts or snap-fits between the first plug-in portion 31 and the second plug-in portion.

The first plug-in portion 31 and the second plug-in portion may be symmetric to each other, and are dielectrically isolated by the first insulation piece 60 in between to prevent a short circuit between the first plug-in portion 31 and the second plug-in portion. The first plug-in portion 31, the first insulation piece 60, and the second plug-in portion may be formed in one piece by in-mold labeling, or may be spliced by machining or the like. The first insulation piece 60 may be further configured to support the first plug-in portion 31 and the second plug-in portion, and can effectively improve the overall insertion stability of the two plug-in portions when the two plug-in portions are inserted in the external device 40.

It is hereby noted that when the first insulation piece 60 abuts between the first plug-in portion 31 and the second plug-in portion, the first groove 33 will not be disposed on an end face that is of the first plug-in portion 31 and that is oriented toward the first insulation piece 60. Similarly, the second groove will not be disposed on an end face that is of the second plug-in portion and that is oriented toward the first insulation piece 60. The first jack 41 may be made on the external device 40. The first plug-in portion 31, the first insulation piece 60, and the second plug-in portion form a whole, and the whole is inserted into the first jack 41.

Further, a first snap-fit slot 34 is made on a surface that is of the first plug-in portion 31 and that is oriented toward the first insulation piece 60. A first snap-fit portion 61 is disposed protrusively on a surface that is of the first insulation piece 60 and that is oriented toward the first plug-in portion 31. The first snap-fit portion 61 is snap-fitted in the first snap-fit slot 34. A second snap-fit slot 51 is made on a surface that is of the second plug-in portion and that is oriented toward the first insulation piece 60. A second snap-fit portion 62 is disposed protrusively on a surface that is of the first insulation piece 60 and that is oriented toward the second plug-in portion. The second snap-fit portion 62 is snap-fitted in the second snap-fit slot 51, so that both the first plug-in portion 31 and the second plug-in portion are snap-fitted to the first insulation piece 60.

Figure 16:
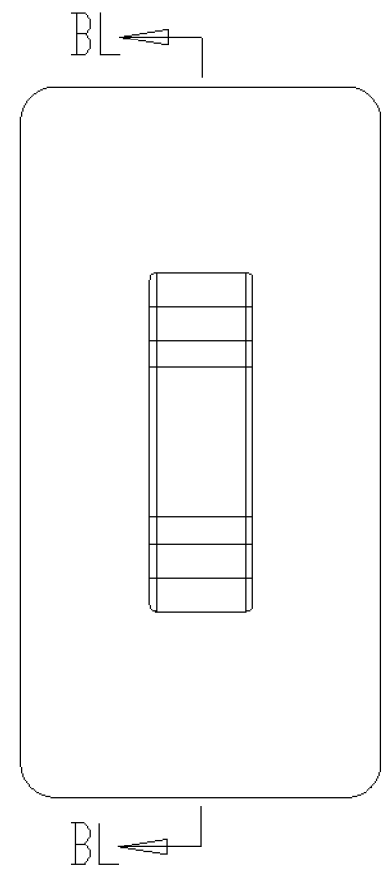
FIG. 16 is a schematic diagram of snap-fit connection of a first insulation piece to a first plug-in portion and a second plug-in portion according to some embodiments of this application.
Figure 16:
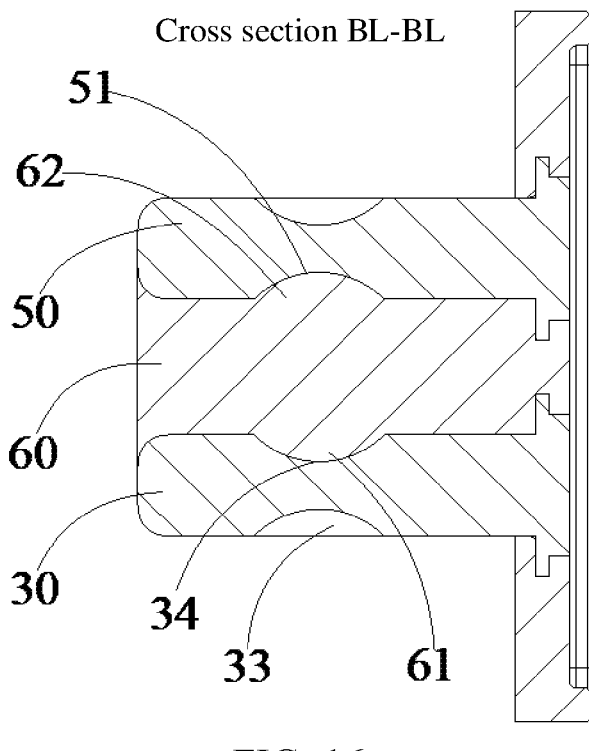
Figure 17:
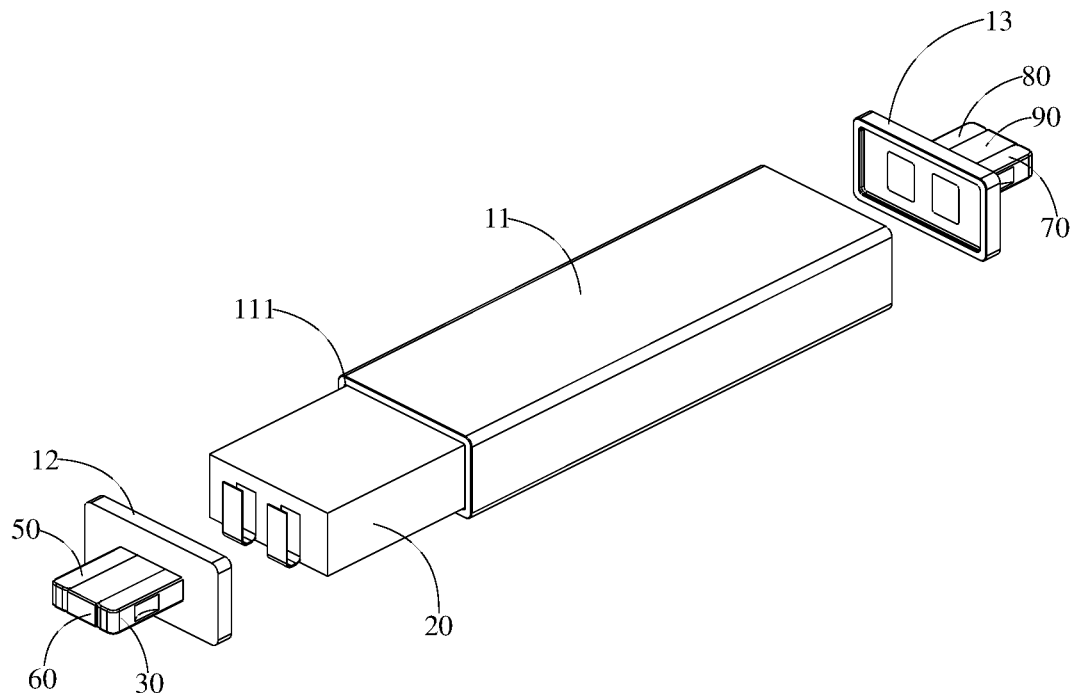
FIG. 17 is a schematic structural diagram of an electrochemical device according to some embodiments of this application.

In this embodiment, the first insulation piece 60 is fixed to the housing 10, and both the first plug-in portion 31 and the second plug-in portion are snap-fitted to the first insulation piece 60. As shown in FIG. 16, the snap-fit portions (61, 62) are disposed on both sides of the first insulation piece 60. The first snap-fit portion 61 of the first insulation piece 60 is snap-fitted to the first snap-fit slot 34 that is of the first plug-in portion 31 and that is close to the first insulation piece 60. The second snap-fit portion 62 of the first insulation piece 60 is snap-fitted to the second snap-fit slot 51 that is of the second plug-in portion and that is close to the first insulation piece 60. This structure can fix the first plug-in portion 31 and the second plug-in portion properly, improve the stability of the two plug-in portions, and effectively alleviate the wobble or dislocation of the two plug-in portions.

It is hereby noted that the first snap-fit slot 34 may be configured in the form of the first groove 33, and the first snap-fit portion 61 may be configured in the form of the first elastic bulge 42. Similarly, the second snap-fit slot 51 may be configured in the form of the second groove, and the second snap-fit portion 62 may be configured in the form of the second elastic bulge.

According to some embodiments of this application, as shown in FIG. 16, the housing 10 further includes a third part 13. A second opening (not shown in the drawing) is further made in the first part 11. The second opening communicates with the accommodation cavity. The third part 13 is connected to the second opening of the first part 11, and the third part 13 and the second part 12 are disposed opposite to each other. Similar to the first part 11 and the second part 12, the third part 13 may be made of rigid plastic, for example, an electrolyte-resistant material such as LCP, PHBA, PET, PVC, Pi, PP, ABS, PC, or PA. The third part 13 may be connected to the second part 12 by welding, snap-fitting, gluing, or the like, so as to form the entire outer package housing 10.

The electrochemical device further includes a third electrode 70 and a fourth electrode 80. Both the third electrode 70 and the fourth electrode 80 are disposed in the third part 13. The third electrode 70 and the fourth electrode 80 are of opposite polarities. The third electrode 70 is disposed opposite to the first electrode 30, and the fourth electrode 80 is disposed opposite to the second electrode 50. The third electrode 70 includes a third plug-in portion (not shown in the drawing) and a third flange portion (not shown in the drawing). The fourth electrode 80 includes a fourth plug-in portion (not shown in the drawing) and a fourth flange portion (not shown in the drawing). Both the third flange portion and the fourth flange portion are snap-fitted to the third part 13, and both the third flange portion and the fourth flange portion are connected to the electrode assembly 20. Both the third plug-in portion and the fourth plug-in portion protrude beyond the outer surface of the third part 13.

As required, the polarity of the third electrode 70 may be set to be identical or opposite to that of the first electrode 30. In this embodiment, the electrode is disposed in the second part 12 and the third part 13 at both ends of the housing 10. In this way, a plurality of electrochemical devices can be connected in series. During the series connection, the first electrode 30 may be connected to the third electrode 70, and the second electrode 50 may be connected to the fourth electrode 80. In addition, because the electrode is disposed on both sides of the housing 10, one electrochemical device is pluggable to two external devices 40 to supply power to the two external devices 40 concurrently.

According to some embodiments of this application, a second aspect of this application further provides an electronic device. The electronic device includes the electrochemical device according to any one of the above embodiments. The electronic device is not particularly limited in this application, and may be any electronic device known in the prior art. For example, the electronic device includes, but is not limited to, a notebook computer, pen-inputting computer, mobile computer, e-book player, portable phone, portable fax machine, portable photocopier, portable printer, stereo headset, smart glasses, video recorder, liquid crystal display television set, handheld cleaner, portable CD player, mini CD-ROM, transceiver, electronic notepad, calculator, memory card, portable voice recorder, radio, backup power supply, motor, automobile, motorcycle, power-assisted bicycle, bicycle, lighting appliance, toy, game console, watch, electric tool, flashlight, camera, large household battery, lithium-ion capacitor, wearable device, and the like.

It is hereby noted that although preferred embodiments of this application have been given in the specification and drawings of this application, this application may be implemented in many different forms, without being limited to the embodiments described herein. The embodiments are not intended to limit the content of this application, but merely to facilitate thorough and comprehensive understanding of the content disclosed herein. In addition, all kinds of embodiments that are not enumerated above but are derived by further combination of the foregoing technical features still fall within the scope covered by this application. Further, all improvements and variations, which may be made by a person of ordinary skill in the art based on the foregoing description, still fall within the protection scope of the claims appended hereto.

What is claimed is:

1. An electrochemical device, comprising a housing and an electrode assembly, wherein the housing defines an accommodation cavity, and the electrode assembly is accommodated in the accommodation cavity; the electrochemical device further comprises a first electrode and a second electrode, and the second electrode is disposed apart from the first electrode;

the first electrode comprises a first plug-in portion, the first plug-in portion extends away from the accommodation cavity and protrudes beyond an outer surface of the housing; and the first plug-in portion is configured to be snap-fitted to a first jack of an external device;

wherein, a first groove is provided on an outer surface of the first plug-in portion and the first groove is configured to be snap-fitted to a first elastic bulge disposed protrusively on an inner wall of the first jack; or, the first elastic bulge is disposed protrusively on the outer surface of the first plug-in portion and the first elastic bulge is configured to be snap-fitted to the first groove made on the inner wall of the first jack, the second electrode comprises a second plug-in portion, the second plug-in portion extends away from the accommodation cavity and protrudes beyond the outer surface of the housing; and the first plug-in portion and the second plug-in portion satisfy the following conditions;

the first plug-in portion and the second plug-in portion are spaced apart in a second direction or in a third direction, the second plug-in portion is configured to be snap-fitted to the first jack of the external device, a second groove is made on an outer surface of the second plug-in portion, and the second groove is configured to be snap-fitted to a second elastic bulge disposed protrusively on an inner wall of the first jack; or, the second elastic bulge is disposed protrusively on the outer surface of the second plug-in portion, and the second elastic bulge is configured to be snap-fitted to the second groove made on the inner wall of the first jack; or the first plug-in portion and the second plug-in portion are staggered in the second direction, the second plug-in portion is configured to be inserted into and snap-fitted to a second jack of the external device, a second groove is made on an outer surface of the second plug-in portion, and the second groove is configured to be snap-fitted to a second elastic bulge disposed protrusively on an inner wall of the second jack; or, the second elastic bulge is disposed protrusively on the outer surface of the second plug-in portion, and the second elastic bulge is configured to be snap-fitted to the second groove made on the inner wall of the second jack;

a first direction is an insertion direction of the first plug-in portion into the first jack of the external device, and the first direction, the second direction, and the third direction are perpendicular to each other, and the electrochemical device further comprises a first insulation structure between the first plug-in portion and the second plug-in portion, the first insulation structure is fixed to the housing, and the first insulation structure abuts directly with the first plug-in portion and the second plug-in portion respectively.

2. The electrochemical device according to claim 1, wherein an outline of the first plug-in portion is in a shape of a cuboid, a cylinder, or a polygonal prism, and the first groove is made on the outer surface of the first plug-in portion.

3. The electrochemical device according to claim 2, wherein an outline of the second plug-in portion is in a shape of a cuboid, a cylinder, or a polygonal prism, and the second groove is made on the outer surface of the second plug-in portion.

4. The electrochemical device according to claim 2, wherein, the outline of the first plug-in portion is in the shape of the cuboid, and the first groove is arc-shaped;

along the first direction, a chord length of the first groove is less than a length of the first plug-in portion, and a length of the first groove is equal to the chord length of the first groove;

along the second direction, a chord height of the first groove is less than a width of the first plug-in portion, and a ratio of the chord length to the chord height of the first groove is 1 to 20; and along the third direction, a height of the first groove is less than a height of the first plug-in portion, wherein the first direction is an insertion direction of the first plug-in portion, and the first direction, the second direction, and the third direction are perpendicular to each other.

5. The electrochemical device according to claim 4, wherein, the first groove satisfies at least one condition selected from the group consisting of:

a. along the first direction, the chord length of the first groove is 1 to 15 mm;

b. along the second direction, the chord height of the first groove is 0.1 to 10 mm; and c. along the third direction, the height of the first groove is less than the height of the first plug-in portion by at least 0.1 mm.

6. The electrochemical device according to claim 4, wherein, the outline of the second plug-in portion is in the shape of the cuboid, and the second groove is arc-shaped;

along the first direction, a chord length of the second groove is less than a length of the second plug-in portion, the chord length of the second groove is 1 to 15 mm, and, on the outer surface of the second plug-in portion, a length of the second groove is equal to the chord length of the second groove;

along the second direction, a chord height of the second groove is less than a width of the second plug-in portion, the chord height of the second groove is 0.1 to 10 mm, and a ratio of the chord length to the chord height of the second groove is 1 to 20; and along the third direction, a height of the second groove is less than a height of the second plug-in portion by at least 0.1 mm.

7. The electrochemical device according to claim 1, wherein the first insulation structure snap-fits between the first plug-in portion and the second plug-in portion.

8. The electrochemical device according to claim 7, wherein, a first snap-fit slot is made on a surface of the first plug-in portion, the surface of the first plug-in portion being oriented toward the first insulation structure; a first snap-fit portion is disposed protrusively on a first surface of the first insulation structure, the first surface of the first insulation structure being oriented toward the first plug-in portion, and the first snap-fit portion is snap-fitted in the first snap-fit slot; and a second snap-fit slot is made on a surface of the second plug-in portion, the surface of the second plug-in portion being oriented toward the first insulation structure, a second snap-fit portion is disposed protrusively on a second surface of the first insulation structure, the second surface of the first insulation structure being oriented toward the second plug-in portion, and the second snap-fit portion is snap-fitted in the second snap-fit slot.

9. An electronic device, comprising an electrochemical device, the electrochemical device comprising a housing and an electrode assembly, wherein the housing defines an accommodation cavity, and the electrode assembly is accommodated in the accommodation cavity; characterized in that, the electrochemical device further comprises a first electrode and a second electrode, and the second electrode is disposed apart from the first electrode;

the first electrode comprises a first plug-in portion, the first plug-in portion extends away from the accommodation cavity and protrudes beyond an outer surface of the housing; and the first plug-in portion is snap-fitted to a first jack of the electronic device, a first groove is made on an outer surface of the first plug-in portion, and the first groove is snap-fitted to a first elastic bulge disposed protrusively on an inner wall of the first jack; or, the first elastic bulge is disposed protrusively on the outer surface of the first plug-in portion, and the first elastic bulge is snap-fitted to the first groove made on the inner wall of the first jack, the second electrode comprises a second plug-in portion, the second plug-in portion extends away from the accommodation cavity and protrudes beyond the outer surface of the housing; and the first plug-in portion and the second plug-in portion satisfy the following conditions;

the first plug-in portion and the second plug-in portion are spaced apart in a second direction or the first plug-in portion and the second plug-in portion are spaced apart in a third direction, the second plug-in portion is configured to be inserted into and snap-fitted to the first jack of the external device, a second groove is made on an outer surface of the second plug-in portion, and the second groove is configured to be snap-fitted to a second elastic bulge disposed protrusively on an inner wall of the first jack; or, the second elastic bulge is disposed protrusively on the outer surface of the second plug-in portion, and the second elastic bulge is configured to be snap-fitted to the second groove made on the inner wall of the first jack; or the first plug-in portion and the second plug-in portion are staggered in the second direction, the second plug-in portion is configured to be inserted into and snap fitted to a second jack of the external device, a second groove is made on an outer surface of the second plug-in portion, and the second groove is configured to be snap-fitted to a second elastic bulge disposed protrusively on an inner wall of the second jack; or, the second elastic bulge is disposed protrusively on the outer surface of the second plug-in portion, and the second elastic bulge is configured to be snap-fitted to the second groove made on the inner wall of the second jack;

a first direction is an insertion direction of the first plug-in portion into the first jack of the external device, and the first direction, the second direction, and the third direction are perpendicular to each other, and the electrochemical device further comprises a first insulation structure between the first plug-in portion and the second plug-in portion, the first insulation structure is fixed to the housing, and the first insulation structure abuts directly with the first plug-in portion and the second plug-in portion respectively.

10. The electronic device according to claim 9, wherein an outline of the first plug-in portion is in a shape of a cuboid, a cylinder, or a polygonal prism, and the first groove is made on the outer surface of the first plug-in portion.

11. The electronic device according to claim 10, wherein an outline of the second plug-in portion is in a shape of a cuboid, a cylinder, or a polygonal prism, and the second groove is made on the outer surface of the second plug-in portion.

12. The electronic device according to claim 10, wherein that the outline of the first plug-in portion is in the shape of the cuboid, and the first groove is arc-shaped;

along the first direction, a chord length of the first groove is less than a length of the first plug-in portion, and a length of the first groove is equal to the chord length of the first groove;

along a second direction, a chord height of the first groove is less than a width of the first plug-in portion, and a ratio of the chord length to the chord height of the first groove is 1 to 20; and along the third direction, a height of the first groove is less than a height of the first plug-in portion, wherein the first direction is an insertion direction of the first plug-in portion, and the first direction, the second direction, and the third direction are perpendicular to each other.

13. The electronic device according to claim 12, wherein that the first groove satisfies at least one condition selected from the group consisting of:

a. along the first direction, the chord length of the first groove is 1 to 15 mm;

b. along the second direction, the chord height of the first groove is 0.1 to 10 mm; and c. along the third direction, the height of the first groove is less than the height of the first plug-in portion by at least 0.1 mm.

14. The electronic device according to claim 12, wherein that the outline of the second plug-in portion is in the shape of the cuboid, and the second groove is arc-shaped;

along the first direction, a chord length of the second groove is less than a length of the second plug-in portion, the chord length of the second groove is 1 to 15 mm, and, on the outer surface of the second plug-in portion, a length of the second groove is equal to the chord length of the second groove;

along the second direction, a chord height of the second groove is less than a width of the second plug-in portion, the chord height of the second groove is 0.1 to 10 mm, and a ratio of the chord length to the chord height of the second groove is 1 to 20; and along the third direction, a height of the second groove is less than a height of the second plug-in portion by at least 0.1 mm.

15. The electronic device according to claim 9, wherein the first insulation structure snap-fits between the first plug-in portion and the second plug-in portion.

16. The electronic device according to claim 15, wherein, a first snap-fit slot is made on a surface of the first plug-in portion, the surface of the first plug-in portion being oriented toward the first insulation structure; a first snap-fit portion is disposed protrusively on a first surface of the first insulation structure, the first surface of the first insulation structure being oriented toward the first plug-in portion, and the first snap-fit portion is snap-fitted in the first snap-fit slot; and a second snap-fit slot is made on a surface of the second plug-in portion, the surface of the second plug-in portion being oriented toward the first insulation structure, a second snap-fit portion is disposed protrusively on a second surface of the first insulation structure, the second surface of the first insulation structure being oriented toward the second plug-in portion, and the second snap-fit portion is snap-fitted in the second snap-fit slot.

* * * * *